Jan. 11, 1966        L. A. WORTMAN        3,228,278

APPARATUS FOR MOTION OF LIGHT CORRESPONDING TO SOUND VARIATIONS

Filed Aug. 14, 1964        3 Sheets-Sheet 1

INVENTOR.
LEON A. WORTMAN

Jan. 11, 1966     L. A. WORTMAN     3,228,278
APPARATUS FOR MOTION OF LIGHT CORRESPONDING TO SOUND VARIATIONS
Filed Aug. 14, 1964     3 Sheets-Sheet 2

INVENTOR.
LEON A. WORTMAN

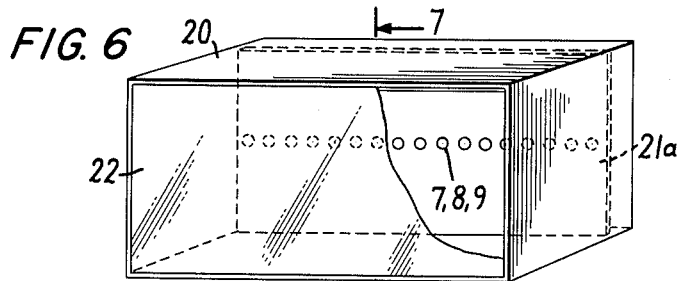
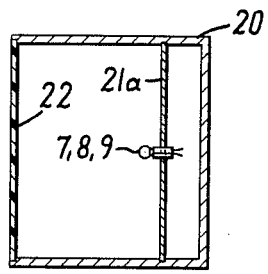
FIG. 6    FIG. 7
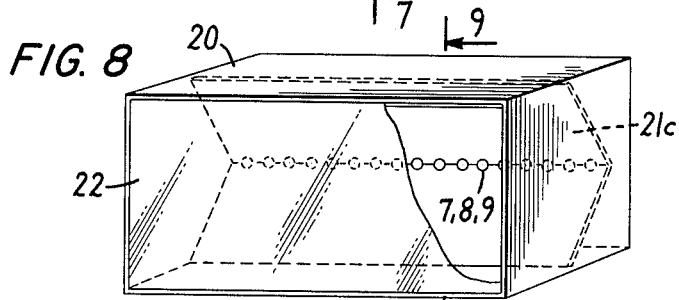
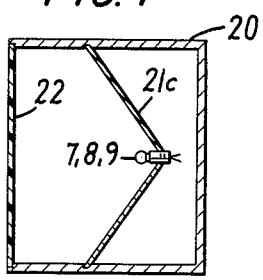
FIG. 8    FIG. 9
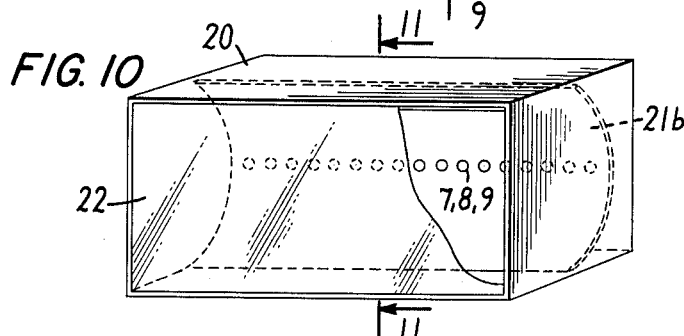
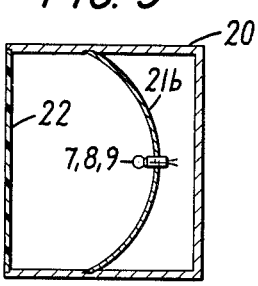
FIG. 10    FIG. 11
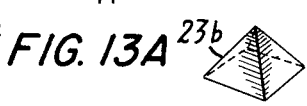
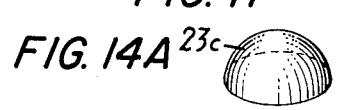
FIG. 12A    FIG. 13A    FIG. 14A
FIG. 12B    FIG. 13B    FIG. 14B
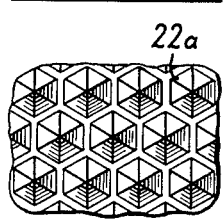
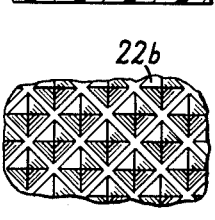
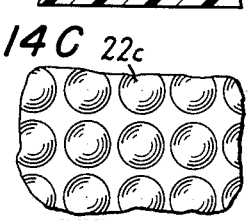
FIG. 12C    FIG. 13C    FIG. 14C
INVENTOR.
LEON A. WORTMAN

United States Patent Office 3,228,278
Patented Jan. 11, 1966

---

3,228,278
APPARATUS FOR MOTION OF LIGHT CORRESPONDING TO SOUND VARIATIONS
Leon A. Wortman, Yonkers, N.Y.
(2106 Louis Road, Palo Alto, Calif.)
Filed Aug. 14, 1964, Ser. No. 389,718
9 Claims. (Cl. 84—464)

This invention relates to an apparatus for achieving visual effects and more particularly to an apparatus for obtaining visual motion of light corresponding to variations in sound. Techniques for conversion of sound to related visual or physical effects are known in the art. The equipment used to perform this conversion is popularly referred to as a "color organ." The purpose of a color organ is to generate a projected or directly viewed pattern of light and color that could be changed at will, and usually is operated in conjunction with the generation of sound.

Circuitry has been evolved, using electro-magnetics or electronics, that enables lamps and physically movable members to be actuated in automatic synchronism with a source of electrical energy such as a hi-fi audio amplifier, and so on. Single lamps, of banks of electrically interconnected lamps are actuated by making them responsive to selected frequencies within a spectrum through the use of a plurality of frequency divider networks placed electrically between the lamps and the source of electrical energy which is the input to the circuitry of the color organ. The movable members of the visual display apparatus use motors, solenoids, relays or magnetic devices which, like the lamps, are actuated by electrical energy in selected frequency bands and are amplitude responsive. Known circuitry makes use of saturable reactors, thyratrons, amplifier tubes, diode rectifiers and silicon controlled rectifiers as the means for energizing the motors, solenoids, relays or magnetic devices.

Heretofore, to achieve the effects of optical motion, physical motion has been employed. Mechanical means have been used to convert variations in electrical energy to variations in spatial relationships between or among visual objects and optical systems. Such devices are cumbersome, complex, volumetrically inefficient, and in accordance with the logic of reliability, become less dependable and reliable as the number of components in the system is increased. Costs, too, become a significant restrictive factor.

Accordingly, it is an object of this invention to create the visual effects of the motion of light completely without the use of mechanical, electro-mechanical, or motorized members of any type.

A related object of the invention is to provide a color organ of compactness, relative lightweight, simplicity, lowered costs and improved reliability and long-life expectancy.

A further object of the invention is to bring color organs to the point where they can be produced for the broad market commonly referred to as the "consumer market."

Another object of the invention is to create the effects of motion of light in different dimensions, singly or simultaneously. These dimensions include lateral, vertical, diagonal, circular, and forward and backward from the observer.

The effects of this invention do not depend upon the use of color, although the use of color, as will be described, may enhance the effect of motion. Color may be added without complicating the basic simplicity of the invention.

An additional object of the invention is to provide a simplified transistor circuit arrangement for actuating the lamp loads, having specially pleasing attack and decay characteristics.

These and other objects of this invention will be apparent from the following description in conjunction with the accompanying drawings in which:

FIGURES 6 through 11 show enclosures suitable for home entertainment purposes;

FIGURES 12, 13 and 14 show desirable configurations of lenticular, translucent panel surfaces suitable for use such as with the enclosures described in connection with FIGURES 6 through 11.

Figure 1:
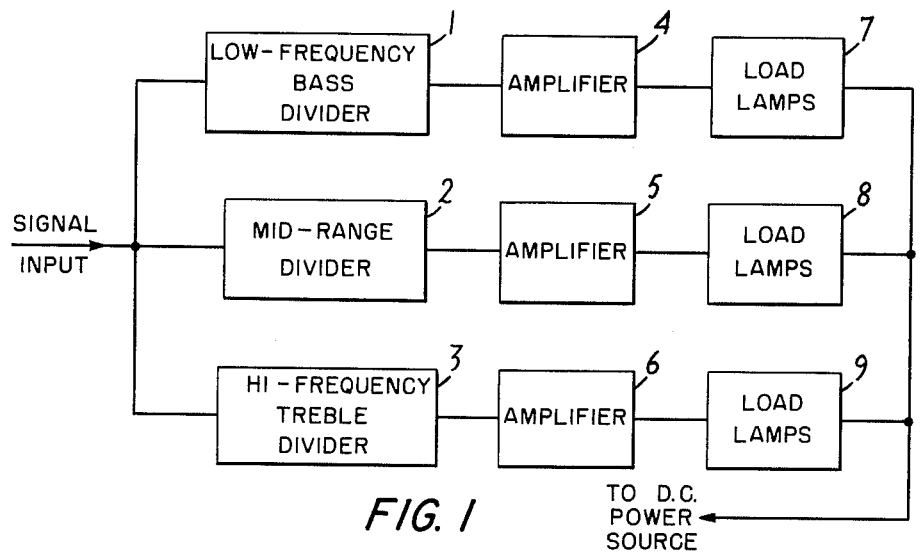
FIGURE 1 is a block diagram of a 3-channel electronic circuit for actuating the display arrangement of the invention.

Referring to FIGURE 1, audio frequency voltages are the source of electrical energy for a plurality of inputs to the circuit arrangement. Three channels provide an adequate plurality for achieving the desired effects but in no way does this mean the plurality is limited to three inputs. As many channels as are desired may be provided, when proper frequency separating or dividing networks are incorporated within the design. Frequency dividers 1, 2 and 3 represent the desirable minimum number of frequency divider networks. They are referred to as bass (or low) middle and treble (or high) channels. Circuitry is well known to the state of the art to accomplish frequency division of the input signals. In an arrangement of a plurality of three channels, it is desirable to provide overlap among the three channels, or rolloff rather than cutoff. In such an arrangement the optimum peak points for F which is the center frequency of the pass bands for each of the three divider networks (1, 2 and 3 in FIGURE 1) may be completed as:

$$F(\text{channel } \#2) = 4 \times F(\text{channel } \#1)$$
$$F(\text{channel } \#3) = 4 \times F(\text{channel } \#2)$$

It should be understood that other relationships amongst the frequency bands may also be used. Frequency rolloff techniques not exceeding 6 db/octave are desirable for smooth transition from channel to channel, as displayed visually by the lamp loads 7, 8 and 9.

The output signals from frequency dividers 1, 2 and 3 are fed to voltage or current amplifiers 4, 5 and 6, respectively. Electric lamp loads 7, 8 and 9 are connected as the loads from amplifiers 4, 5 and 6, respectively. With no signals present at the inputs to frequency dividers 1, 2 and 3, the lamp loads 7, 8 and 9 are dark or extinguished. As a signal voltage is applied, the lamp loads responsive to the frequency bands containing the signal source voltage will tend to be illuminated at an intensity that is greater than that of the other lamp loads. As the amplitude of the signal source voltage is increased, the lamp loads increase in light output. Conversely, as the signal source voltage is decreased the lamp loads decrease in light output. As the number of channels is increased (the plurality of inputs), it becomes essential to increase the steepness of the slope of the aforementioned rolloff characteristics of the frequency divider networks to maintain separation among the channels.

Figure 2:
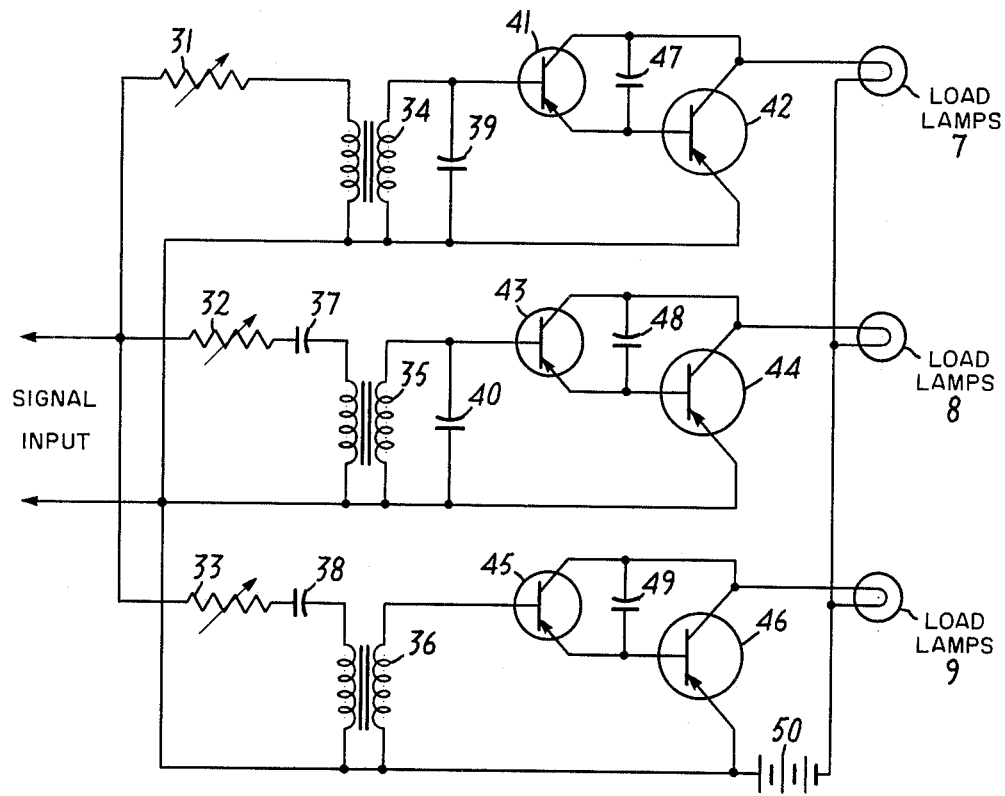
FIGURE 2 is a circuit diagram of the 3-channel circuit described in connection with FIGURE 1.

A simple transistorized arrangement for performing the circuit functions of each channel is shown in FIGURE 2.

The input signals are obtained from a source of electrical signals such as the output of an audio amplifier. These signals may represent music and be present in the full frequency spectrum of a symphony orchestra, as an example. The input signals are impressed across variable resistors 31, 32 and 33. Variable resistors 31, 32 and 33 serve to control and balance the level of the signals in each of the frequency channels. The variable resistors 31, 32 and 33 are connected respectively to transformer 34, and capacitor and transformer combinations 37 and 35 and 38 and 36. Capacitors 39 and 40 are connected across transformer 34 and 35 respectively. Capacitors 37 and 40 and transformer 35 are dimensioned to pass the middle range of frequencies in the input signals. Capacitor 38 and transformer 36 are dimensioned to pass the highest range of frequencies in the input signals. Capacitor 39 and transformer 34 are dimensioned to pass the lowest range of frequencies in the input signals.

The lower, middle and higher frequency channels are thus defined by the frequency discriminating characteristics of the transformers and capacitors as above described.

The signals in each frequency band pass to the compound arrangement of PNP transistors in each channel. These compound transistors 41, 42 and 43, 44 and 45, 46 amplify the signals in the lower, middle and higher frequency bands respectively. D.C. voltage source 50 provides the operating voltages for the transistors. The amplified output signals appear at the collector electrodes of the transistors and actuate the load lamps diagrammatically represented by the filaments 7, 8 and 9. The load lamps 7, 8 and 9 represent groups of load lamps electrically connected and arranged in a manner to be described.

Capacitors 47, 48 and 49 are connected across the emitter and collector of the first transistors 41, 43 and 45, and become maximum charged when the output of the first transistors 41, 43 and 45 are at a maximum. When the output in any channel falls with a fall in the input signals, the associated capacitor 47, 48 and 49 tends to discharge through the base of the second transistor 42, 44 and 46 and tends to retain the transistor in a conducting condition. With the capacitors 47, 48 and 49 connected as described, the circuit displays fast attack, slow decay characteristics which enhance the movement of light in a pleasing manner. It has been found that when the decay of the load lamps is somewhat delayed behind the decay of the input signals, the visual effect contains less flicker and is more pleasing to the viewer. To achieve this effect, the capacitors 47, 48 and 49 are connected across the pair of electrodes in the first transistors 41, 43 and 45 which are connected directly to the second transistors 42, 44 and 46.

Figure 3:
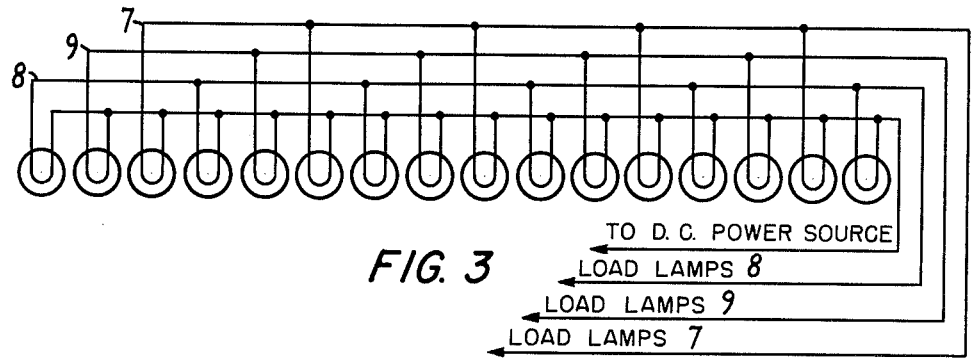
FIGURES 3, 4 and 5 are circuit diagrams of 3-channel arrangements of the electrically connected lamp loads for achieving the effects of lateral motion, diagonal motion, and circular motion respectively.

With the input signals from the signal source divided into at least three frequency bands and amplified and directed so as to actuate the load lamps individually associated with each frequency band, the effect of motion of light depends upon the arrangement of the electrically connected load lamps. FIGURE 3 is an arrangement of the lamp loads for achieving the effect of the lateral motion of light.

Lamps which comprise the "lamp loads" 7, 8, 9, in FIGURE 1 are arranged in a linear and horizontal fashion. Individual lamps within the same group are electrically connected together, in series or in parallel, depending upon the characteristics of the lamps selected for the loads. The lamps are arranged so that the channels appear alternately in the arrangement; i.e., from left to right, middle 8, high 7, low 9, middle 8, high 7, etc. It has been observed that the alternate visual arrangement of the channels contributes strongly to the effect of the motion of light.

The lamps may be clear or colored. If colored, the lamps within a channel are of the same color; e.g.: blue for all lamps in the low channel, red for all lamps in the middle channel, and green for all lamps in the high channel.

The spacing of the lamps should be a function of filament width in order to achieve the desired pleasing and dramatic effects of spatial motion. It has been observed that with radio pilot lights approximately .25 inch in filament width, the lamps should be spaced about .75 inch from filament center to filament center. This has been found to be the optimum spacing to accomplish the effects of optical motion. The spacing may be increased. However, it is found that the effects of motion may become so pronounced and appear to be so staccato-like that some observers may actually experience unpleasant effects, popularly referred to as "motion sickness." With lamps of other sizes the optimum spacing should be related to the spacing for pilot lights, i.e., ¾" multiplied by the ratio of the filament width of the particular lamp to the filament width of .25 inch radio pilot lights. This yields the relationship that 3×width of the filament expressed in inches provides the filament center to filament center spacing for all lamps. The illusion of forward and backward motion is achieved by an arrangement of the individual lamps in which the load lamp group 8 associated with the middle channel in an odd number of channels has a total number of individual lamps that is 1 more than those in the low and high channels. When color is used, the arrangement is such that the line of lamps starts and ends with the color of the middle channel. In the arrangement of lamp loads, shown in FIGURE 3, the motion appears as the intensity of illumination of the lamp loads is increased or decreased individually. The lamp load group receiving the signal of highest amplitude glows most brightly and appears to "move" into the foreground, and retreats to the background as the amplitude of the signal actuating the lamp load group is decreased. Thus, by means of illustration, an arpeggio of music, fixed in signal amplitude so that all notes in the arpeggio are alike in average amplitude, that might start at the bass or low end of the audio spectrum, passing through the portion of the spectrum to which the middle channel responds, moving into the treble or high channel to actuate the respective lamp load groups, creates the illusion of lateral motion coincident with forward and backward motions. The same effect is noted when starting at the high end of the spectrum, moving to the low end, and passing through the middle channel. Increased spacing between individual lamps increases the apparent speed of the visual motion of the display.

Figure 4:
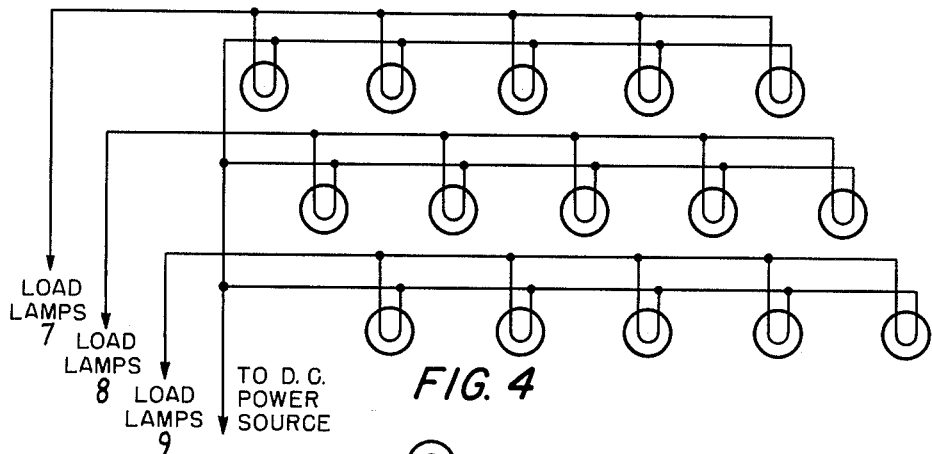
Figure 5:
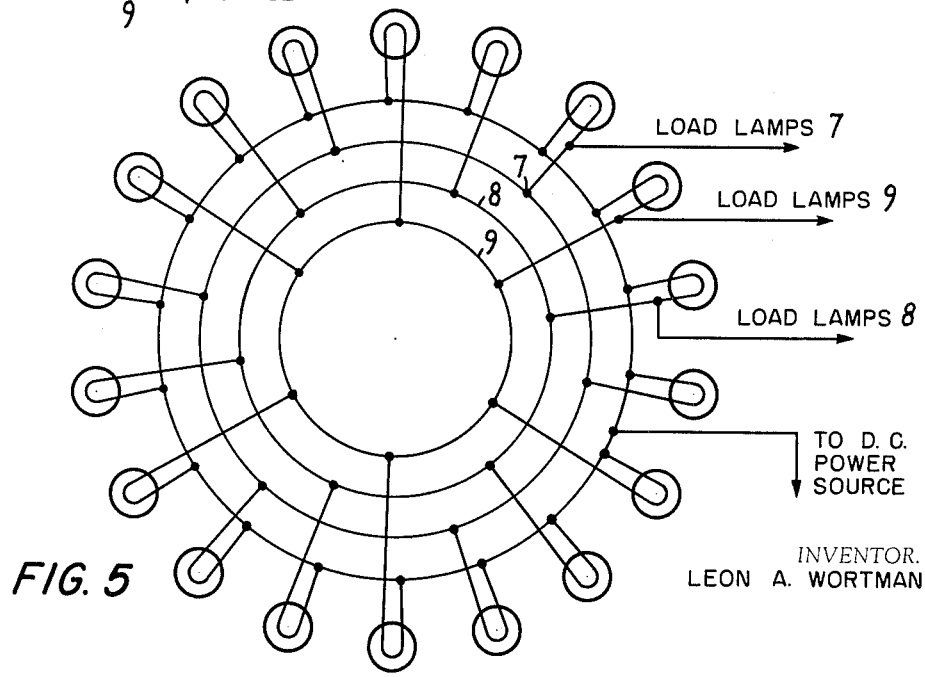

FIGURE 4 shows the arrangement for achieving diagonal motion. FIGURE 5 shows the arrangement of lamps for achieving circular motion.

The arrangements of the lamps require the placement of individual lamps for each of the channels so that the channels appear alternately in the arrangements. They may be started in any sequence.

The arrangement of lamps shown in FIGURES 3, 4 and 5 may be enclosed in various enclosures suitable for home entertainment purposes. FIGURES 6 through 11 show various enclosures 20. With radio type pilot lights as the load lamps 7, 8 and 9, the enclosures 20 may be similar in rectangular dimensions to those used with so-called bookshelf loadspeaker enclosures. The lamps 7, 8 and 9 are mounted on a reflective panel 21A to provide focus and improve forward light transmission. An arcuate reflector panel 21B or an angular reflector panel 21C contributes, in addition, to the effect of motion by reflecting the filament glow of the load lamps 7, 8 and 9 in a physical sense, the glow of the filaments being enlarged by the focus of the arcuate reflector plane 21B or the angular reflector plane 21C.

The angular reflected pattern viewed through a lenticular front panel 22 becomes extended in a vertical plane and enhances the vertical effect and adds to the motional effect created by the lenticular panel 22. A panel 22 of translucent material is interposed between the observer and the lamps 7, 8 and 9. At least one surface of the panel is lenticular. FIGURES 12, 13 and 14 diagram desirable configurations of the lenticular surfaces. The lenses are shown in a convex design. They may also be used in a concave design. A striated surface for the translucent panel is considered to be a lenticular configuration, used effectively as part of the invention.

FIGURE 12A shows a hexagonal pyramid-shaped lens 23A, either concave or convex. FIGURE 12B is a cross-section view of the panel 22A. FIGURE 12C is a view directly at the surface of the panel 22A. FIGURE 13A is a four-side pyramid-shaped lens 23B, concave or convex. FIGURE 13B is a cross-section view of the panel 22B. FIGURE 13C is a view directly at the surface of the panel 23B. FIGURE 14A is a circular lens 23C, either concave or convex. FIGURE 14B is a cross-section view of the panel 22C. FIGURE 14C is a view directly at the surface of the panel 22C. The use of a lenticular panel 22 between observer and lamps significantly contributes to the optical effect by providing an enlarged pattern based upon the illuminated filaments of the lamp loads. It has been observed that with radio pilot lights for lamp loads the optimum distance between lamp filaments 7, 8 and 9 and lenticular surface of the panel 22 is 4″ to achieve the most desirable effects. Further distances diffuse the pattern, reduce apparent brilliance, and have the visual effect of increasing the spacing between filaments. Smaller spacing between lenticular surface and lamp filaments has the effect of increasing the apparent brilliance of the viewed patterns, with a reduction in pattern size. With lamps of other sizes, the optimum distance between the lamp filaments and the lenticular surfaces of the panel 22 should be related to the distance for pilot lights, i.e., 4″ multiplied by the ratio of the filament width of the particular lamp to the filament width of .25 inch radio pilot lights. This yields the relationship that 16 × width of the filament expressed in inches provides the optimum distance for all lamps.

To eliminate the undesirable effects of ambient light striking the inner surface of the translucent panel, which ambient light would diminish the apparent brilliance of the images generated by the lamp loads, the entire display is housed in enclosure 20. The overall brilliance of the display can be improved by painting the interior surfaces of enclosure 20 a flat white.

The translucent front panel is molded of styrene or acrylic which offer excellent light transmission characteristics and high durability at low cost; glass panels may be used, usually at greater cost, increased weight and high fragility. Experience has shown that the minimum number of bulbs in any group of the lamp loads 7, 8 and 9 can be reduced to 1 lamp per channel. The overall dimensions of the display can then be reduced to as little as that of a 4″ cube. However, the optical effect is fully realized with a display approximately 20″ across its front, and 9″ in height. As the display is enlarged to become a "wall to wall" installation, the visible motion becomes exceptionally dramatic and emotionally exciting.

Although the invention has been described herein with reference to specific embodiments, many modifications and variations therein will occur readily to those skilled in the art. Accordingly, such variations and modifications are included within the intended scope of the invention as defined by the following claims.

What is claimed is:

1. An arrangement for displaying the visual effect of motion of light in response to variations in electrical signals comprising an input circuit for electrical signals, a plurality of frequency discriminating channels connected to said input circuit, each of said channels including means for passing a specific frequency band of signals and means for amplifying the signals in said passed band, display means coupled to said channels and powered thereby, said display means comprising an arrangement of groups of load lamps, each of said groups being connected to a different one of said channels, each of said groups comprising a plurality of electrically connected load lamps, said load lamps associated with different channels being placed in alternate pattern in said arrangement, said plurality of channels being odd in number and the group connected to the channel passing the middle band of frequencies having one more load lamp than do the other groups.

2. The arrangement according to claim 1 in which said load lamps are spaced apart from filament center to filament center a distance of approximately 3 times their filament widths.

3. The arrangement according to claim 1 in which a lenticular translucent panel is positioned in front of said load lamps at a distance of approximately 16 times the filament width of said load lamps.

4. An arrangement for displaying variations in light corresponding to variations in electrical signals comprising an input circuit for incoming electrical signals, frequency discriminating means connected to said input circuit for dividing sad incoming signals into an odd numbered plurality of specific frequency bands, a corresponding plurality of amplifier channels for amplifying the signals in each of said frequency bands, a corresponding plurality of groups of pluralities of electrically interconnected load lamps, each of said groups being connected to receive the signals from a different one of said channels to be powered thereby, the load lamps associated with each of said groups being arranged so that said signals from said channels appear alternately in display arrangement and the group of load lamps connected to receive signals from the channel passing the middle frequency band of signals contains at least one more load lamp than do the other groups.

5. The arrangement according to claim 4 in which each of said amplifier channels comprises an arrangement of first and second transistors in compound connection, each of said transistors having at least three electrodes, a source of direct current connected to said transistors for providing operating voltages thereto, capacitive means connected across the pair of electrodes in said first transistor which are connected directly to a pair of electrodes in said second transistor.

6. The arrangement according to claim 4 in which said load lamps are spaced apart from filament center to filament center a distance of approximately 3 times their filament widths.

7. The arrangement according to claim 4 in which a lenticular translucent panel is positioned in front of said load lamps at a distance of approximately 16 times the filament width of said load lamps.

8. An arrangement for displaying variations in light in response to variations in electrical signals comprising an input circuit for electrical signals, a plurality of frequency discriminating channels connected to said input circuit, each of said channels including means for passing a specific frequency band of signals and means for amplifying the signals in said passed bands, display means coupled to said channels and powered thereby, said display means comprising an arrangement of groups of pluralities of load lamps, each of said amplifying means comprises first and second transistors in compound connection, each having an emitter, collector and base, said signals entering the base of said first transistor, the emitter of said first transistor being directly connected to the base of said second transistor, said collectors of both transistors being connected in common and forming an output for said amplifying means, capacitive means connected between said common collector connection and said connection between said emitter of said first transistor and said base of said second transistor, and a source of direct current connected to said transistors and arranged to provide the operating voltages for said transistors.

9. An arrangement for displaying variations in light in response to variations in electrical signals comprising an input circuit for electrical signals, a plurality of frequency discriminating channels connected to said input circuit, each of said channels including means for passing a specific frequency band of signals and means for amplifying the signals in said passed bands, display means coupled to said channels and powered thereby, said display means comprising an arrangement of groups of pluralities of load lamps, each of said amplifying means comprises an arrangement of first and second transistors in compound connection, each of said transistors having at least three electrodes, a source of direct current connected to said transistors for providing operating voltages thereto and capacitive means connected across the pair of electrodes in said first transistor which are connected directly to a pair of electrodes in said second transistor.

References Cited by the Examiner

UNITED STATES PATENTS

| 1,977,997 | 10/1934 | Patterson | 84—464 |
| 2,131,934 | 10/1938 | Burchfield | 84—464 |
| 3,038,061 | 6/1962 | O'Reilly | 84—464 X |

FOREIGN PATENTS 449,656  9/1927  Germany.

LEO SMILOW, *Primary Examiner.*

S. J. TOMSKY, *Assistant Examiner.*